(12) United States Patent
Weatherby

(10) Patent No.: US 8,002,404 B2
(45) Date of Patent: Aug. 23, 2011

(54) PRESCRIPTION LENS AND METHOD OF MAKING SAME

(75) Inventor: Kenneth Allen Weatherby, Atlantic Beach, FL (US)

(73) Assignee: Polylite Taiwan Co., Ltd., Tao-Yuan County (TW)

( * ) Notice: Subject to any disclaimer, the term of this patent is extended or adjusted under 35 U.S.C. 154(b) by 104 days.

(21) Appl. No.: 12/470,811

(22) Filed: May 22, 2009

(65) Prior Publication Data

US 2010/0296048 A1  Nov. 25, 2010

(51) Int. Cl.
*G02C 7/02* (2006.01)
*G02C 7/06* (2006.01)

(52) U.S. Cl. .................. 351/159; 351/168; 351/169

(58) Field of Classification Search .............. 351/159, 351/168, 169
See application file for complete search history.

(56) References Cited

U.S. PATENT DOCUMENTS

| | | | |
|---|---|---|---|
| 5,953,098 A * | 9/1999 | Lieberman et al. | 351/160 R |
| 6,030,077 A * | 2/2000 | Sawano et al. | 351/161 |
| 6,334,681 B1 * | 1/2002 | Perrott et al. | 351/159 |
| 6,789,896 B2 | 9/2004 | Morris et al. | |
| 7,029,116 B2 * | 4/2006 | Roscini | 351/159 |
| 7,029,117 B2 * | 4/2006 | Suzaki et al. | 351/160 R |
| 7,717,559 B2 * | 5/2010 | Ito et al. | 351/177 |
| 2002/0060776 A1 * | 5/2002 | Hodur et al. | 351/161 |
| 2007/0159593 A1 * | 7/2007 | Hibino et al. | 351/160 R |
| 2010/0066974 A1 * | 3/2010 | Croft et al. | 351/163 |
| 2010/0079723 A1 * | 4/2010 | Kingston et al. | 351/176 |
| 2010/0149492 A1 * | 6/2010 | Allione et al. | 351/246 |

FOREIGN PATENT DOCUMENTS

FR  2 910 645  *  6/2008

* cited by examiner

*Primary Examiner* — Jordan Schwartz
(74) *Attorney, Agent, or Firm* — Morris Manning & Martin, LLP; Tim Tingkang Xia, Esq.

(57) ABSTRACT

The present invention relates to a method for manufacturing a prescription lens. In one embodiment, the method includes the steps of obtaining information of a prescription lens and information of a frame to accommodate the prescription lens, wherein the information of the prescription lens comprises a lens power, an optical area and a spherical front base curve, and wherein the information of the frame comprises a frame curve; calculating the maximum lens thickness of the prescription lens at the optical area according to the information of the prescription lens; selecting a lens according to the calculated maximum lens thickness at the optical area, the information of the prescription lens and the information of the frame; and processing the selected lens so as to obtain the prescription lens that has an intermediate zone surrounding the optical area and an edge portion surrounding the intermediate zone such that the thickness of the edge portion is substantially thinner than the maximum lens thickness of the optical area.

12 Claims, 9 Drawing Sheets

PRESCRIPTION LENS AND METHOD OF MAKING SAME

FIELD OF THE INVENTION

The present invention relates generally to a lens, and more particularly to a prescription lens and a method of manufacturing same.

BACKGROUND OF THE INVENTION

Lenses used in eyeglasses or spectacles for treating myopia, hyperopia, astigmatism and presbyopia of a wearer, or used in sunglasses or protective eyeglasses having wrap-around segments designed to shield the eye from incident light, wind and foreign objects in the temporal vision field of a wearer, have certain optical properties corresponding to a set of specifications as described in a prescription for the wearer.

These lenses are usually prescribed to have a front curved lens surface designed to fit a curve profile of frames. As shown in FIG. 9, for a minus lens 900 with a front curved lens surface 910, the lens edge 920 is thicker than the other area of the lens 900. The larger the front base curve of a minus lens is, the thicker the lens edge of the minus lens is. For example, for a lens with a minus prescription of −4.00 sphere, if the lens has a front base curve of 2.00, the back surface curve of the lens would be of 6.00. If the lens has a front base curve of 4.00, the back surface curve of the lens would be of 8.00. The edge thickness of the lens with the front base curve of 4.00 is larger than that of the lens with the front base curve of 2.00. Traditionally, a patient with a strong minus prescription needs a lens with a very thick edge. Therefore, traditionally the myopia patient will use flatter ophthalmic frame base curve to reduce lens thick edge.

The large thickness at the edge of a lens may have a number of disadvantages such as obscuring wearer's views at wide angles, unappealing appearance, increasing the lens weight, and so on.

Additionally, conventional prescription lens is almost impossible to match with sunglass frame since most of sunglass frame use base curve 6 or 8, whereas conventional minus lens is using base curves between 2 and 4. For instance, for a minus lens of −4.00, its thickness will be extremely thick if the frame base curve is about 6.00 (so as to lens) and lens back side curve shall be cut at a base curve 10 regardless of solution of inadequate bevel matching attempt.

Therefore, a heretofore unaddressed need exists in the art to address the aforementioned deficiencies and inadequacies.

SUMMARY OF THE INVENTION

In one aspect, the present invention relates to a method for manufacturing a prescription lens. In one embodiment, the method includes the step of obtaining information of a prescription lens and information of a frame to accommodate the prescription lens, where the information of the prescription lens comprises a lens power, an optical area and a spherical front base curve, and the information of the frame comprises a frame curve.

The method further includes the steps of calculating the maximum lens thickness of the prescription lens at the optical area according to the information of the prescription lens; selecting a lens according to the calculated maximum lens thickness at the optical area, the information of the prescription lens and the information of the frame; and processing the selected lens so as to obtain the prescription lens that has an annular intermediate zone surrounding the optical area and an edge portion surrounding the intermediate zone such that the thickness of the edge portion is substantially thinner than the maximum lens thickness of the optical area. In one embodiment, the frame curve is characterized with an angle and tilt of the frame. The spherical front base curve of the prescription lens matches the frame curve of the frame.

The prescription lens has a geometric center and an optical center that is corresponding to the center of the optical area of the prescription lens. In one embodiment, the optical center is substantially coincident with the geometric center. In another embodiment, the optical center is substantially displaced from the geometric center.

In one embodiment, the prescription lens is a single vision lens. In another embodiment, the prescription lens is a progressive lens. Additionally, the prescription lens can be a plus lens or a minus lens.

In one embodiment, the selected lens is a finished lens. The processing step is performed by injection, casting and cutting the edge portion of the finished lens so that the thickness of the edge portion is substantially constant and thinner than the maximum lens thickness of the optical area.

In another embodiment, the selected lens is a semi-finished lens. The processing step is performed by cutting a predetermined area of the semi-finished lens to form the optical area therein and cutting the edge portion of the semi-finished lens so that the thickness of the edge portion is constant and substantially thinner than the maximum lens thickness of the optical area.

The prescription lens is formed of glass or plastic.

In another aspect, the present invention relates to a prescription lens manufactured according to the method disclosed above.

In yet another aspect, the present invention relates to a prescription lens. In one embodiment, the prescription lens fitted for an eyeglass frame has a spherical front lens surface with a front base curve configured to match a curve profile of the frame, and a rear lens surface curved such that the lens has a central optical zone, an annular intermediate zone surrounding the central optical zone, and an annular edge zone surrounding the intermediate zone, where the rear lens surface in the central optical zone has a curvature such that the central optical zone of the lens has a lens power substantially equal to a prescription for a wearer of the lens, the rear lens surface in the edge zone has a substantially flat profile, and the rear lens surface in the intermediate zone has a curvature that smoothly bridges the curvature of the rear lens surface in the central optical zone and the flat profile of the rear lens surface in the edge zone. The thickness of the edge portion is substantially constant and thinner than the maximum lens thickness of the optical area. The lens body has a geometric center and an optical center that is corresponding to the center of the optical area. In one embodiment, the optical center is substantially coincident with the geometric center. In another embodiment, the optical center is substantially displaced from the geometric center.

The spherical front lens surface is configured to match the frame curve of a frame. In one embodiment, the rear lens surface at the optical area of the lens body is configured such that the lens body at the optical area corresponds to a single vision lens. In another embodiment, the rear lens surface at the optical area of the lens body is configured such that the lens body at the optical area corresponds to a progressive lens. In one embodiment, the rear lens surface at the optical area of the lens body is configured such that the lens body at the optical area corresponds to a plus lens. In one embodiment, the rear lens surface at the optical area of the lens body is configured such that the lens body at the optical area corresponds to a minus lens.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, wherein.

DETAILED DESCRIPTION OF THE INVENTION

Figure 1:
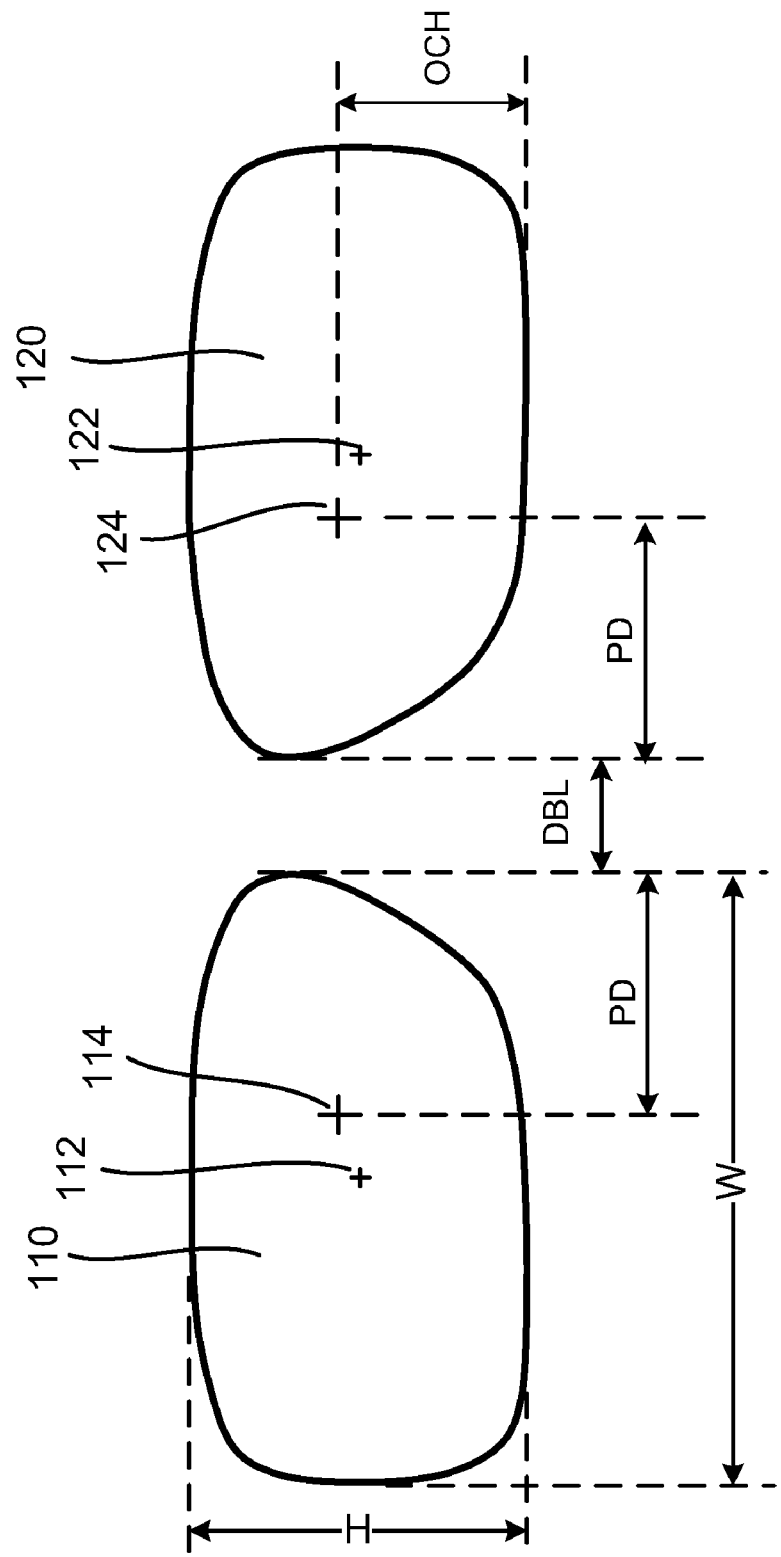
FIG. 1 shows schematically a pair of glasses with prescribed parameters.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-8. In accordance with the purposes of this invention, as embodied and broadly described herein, this invention, in one aspect, relates to a prescription lens and a method for manufacturing same.

FIG. 1 illustrates schematically lenses 110 and 120 used in a pair of eyeglasses with the prescription information of the lenses 110 and 120 (a set of specifications) as described in a prescription for a wearer. The prescription information includes a size of the lenses 110 and 120 including a height, H, and a width, W, a pupillary distance (PD) that is the distance (usually measured in millimeters) between the center 114 (124) of the pupil in an eye and the inner edge of the lens 110 (120), a distance between the lenses (DBL) that is distance between the inner edges of the lens 110 (120), and optical center height (OCH). The size of the lenses 110 and 120 is adapted for fitting an eyeglass frame, and used to select proper lens blanks to produce the lenses 110 and 120. The size information defines the geometric center 112 (122) of the lens 110 (120). Additionally, the pupillary distance (PD) defines the optical center 114 (124) of the lens 110 (120). The prescription information also includes a lens power, a front base curve, sphere power, cylinder power, axis, distance vision (DV), near vision (NV), and so on, for each lens 110 or 120.

Figure 2:
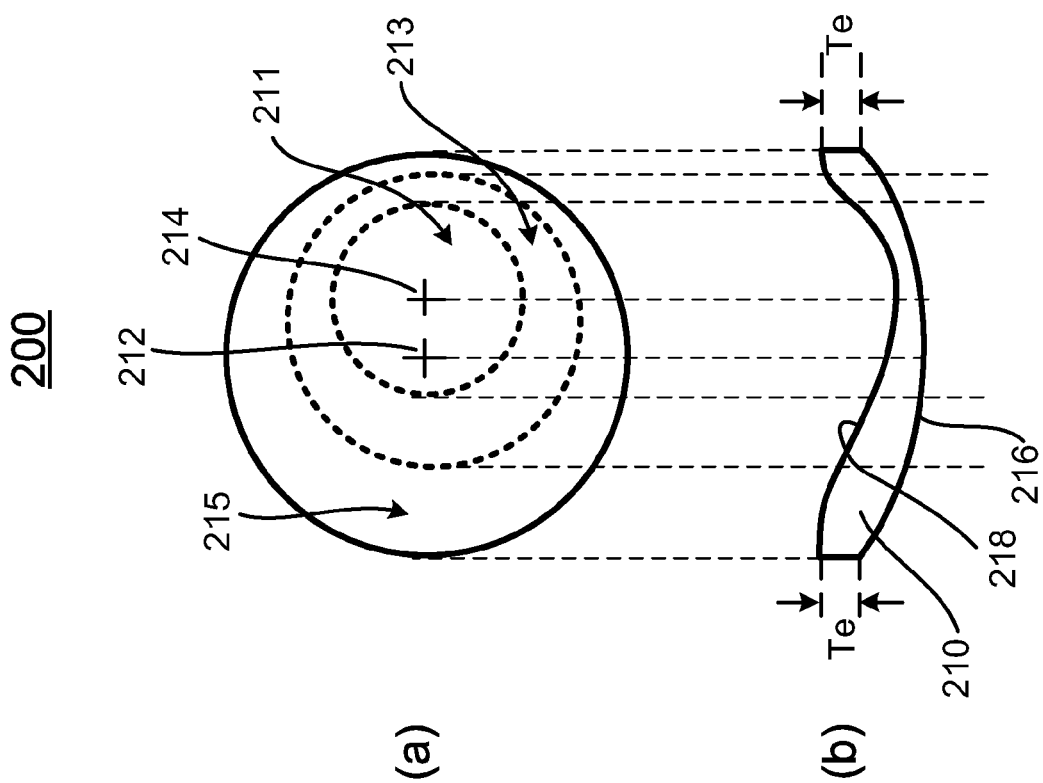
FIG. 2 shows schematically a prescription lens according to one embodiment of the present invention, (a) a top view, and (b) a side view.
Figure 3:
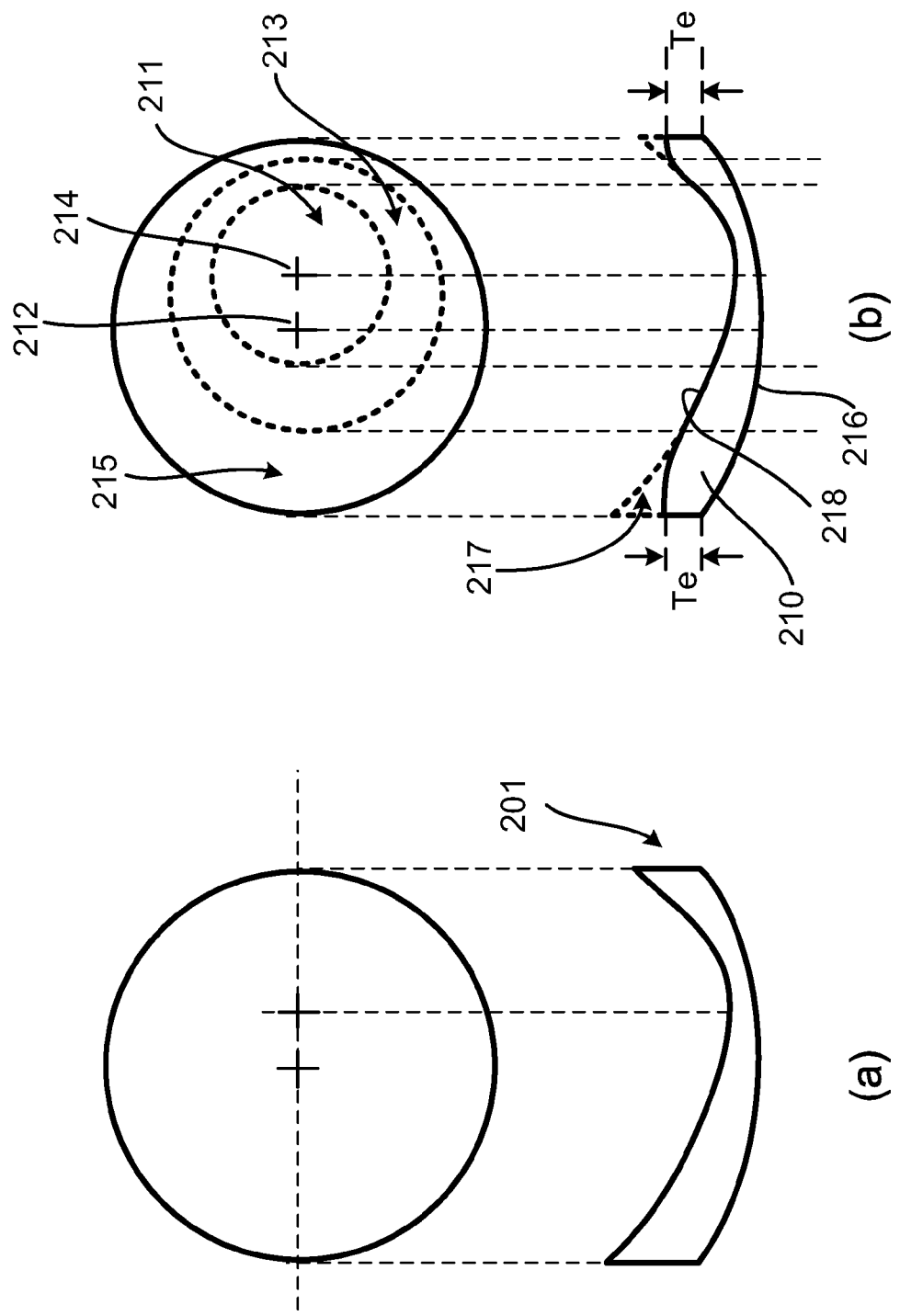
FIG. 3 shows schematically (a) a lens blank, and (b) a prescription lens produced from the lens blank according to one embodiment of the present invention.
Figure 4:
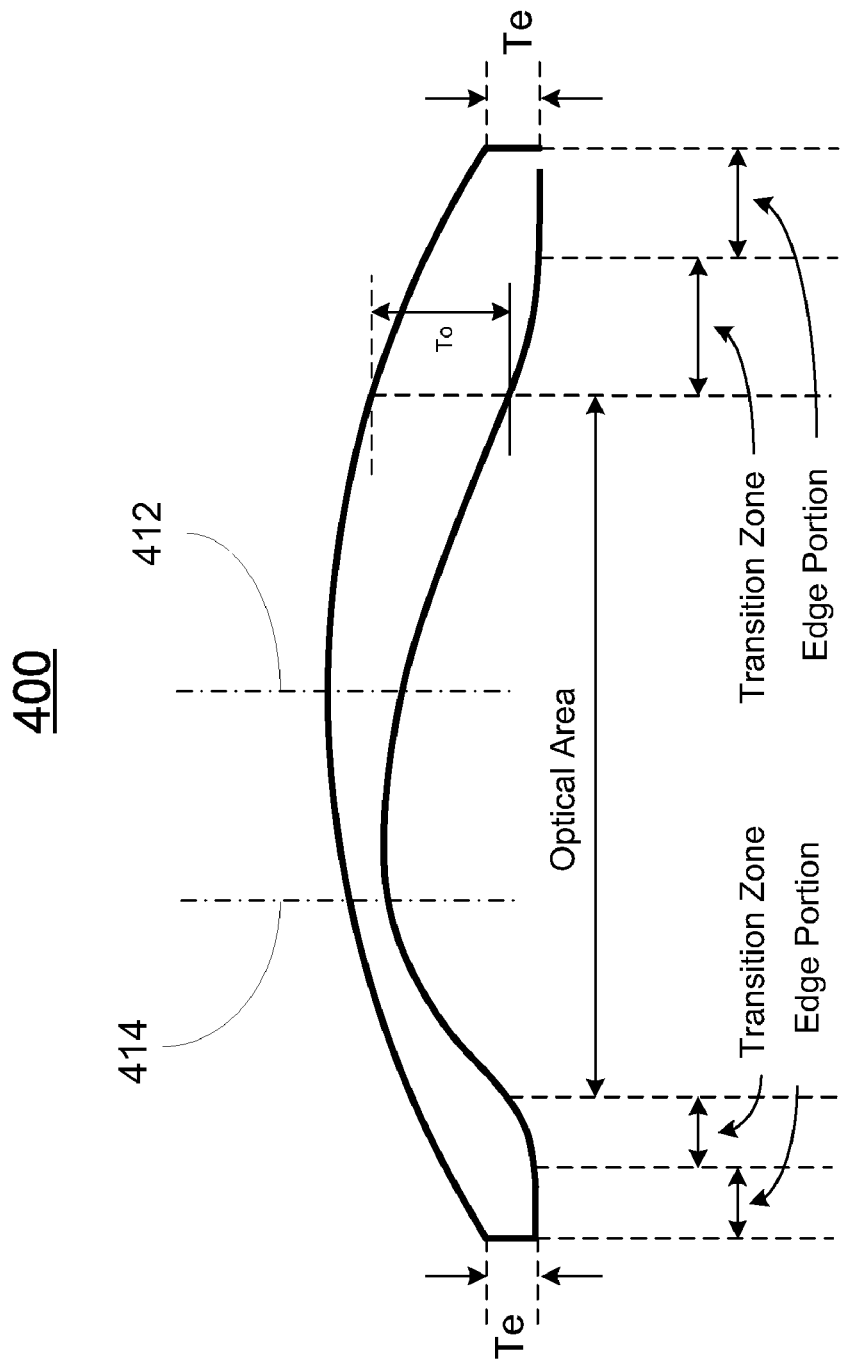
FIG. 4 shows schematically a prescription lens according to one embodiment of the present invention.
Figure 5:
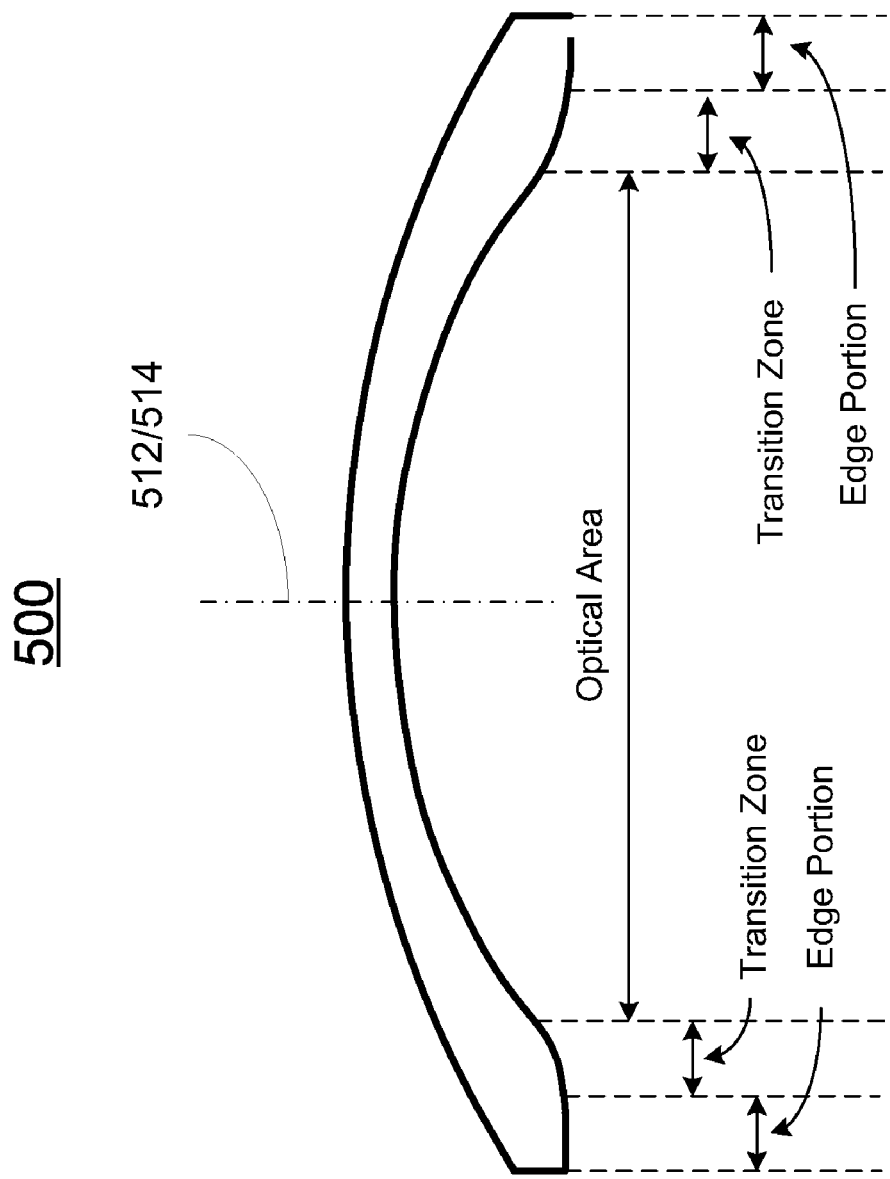
FIG. 5 shows schematically a prescription lens according to another embodiment of the present invention.
Figure 7:
FIG. 7 shows schematically a prescription lens according to a further embodiment of the present invention.
Figure 8:
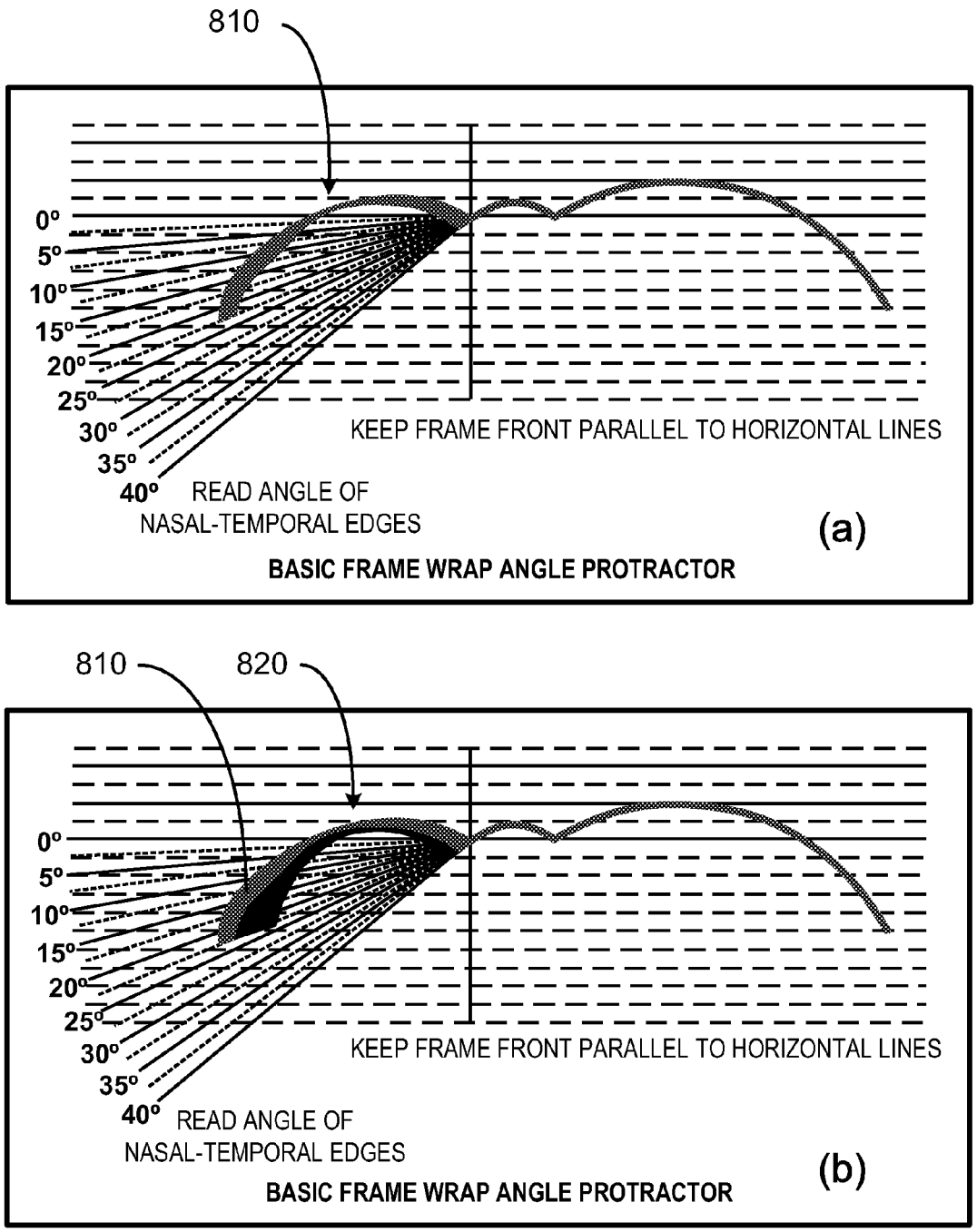
FIG. 8 shows schematically (a) a top view of a prescribed minus lens according to one embodiment of the present invention, showing how the 22 degree wrap angle is determined, and (b) a top view of a traditional minus lens.
Figure 9:
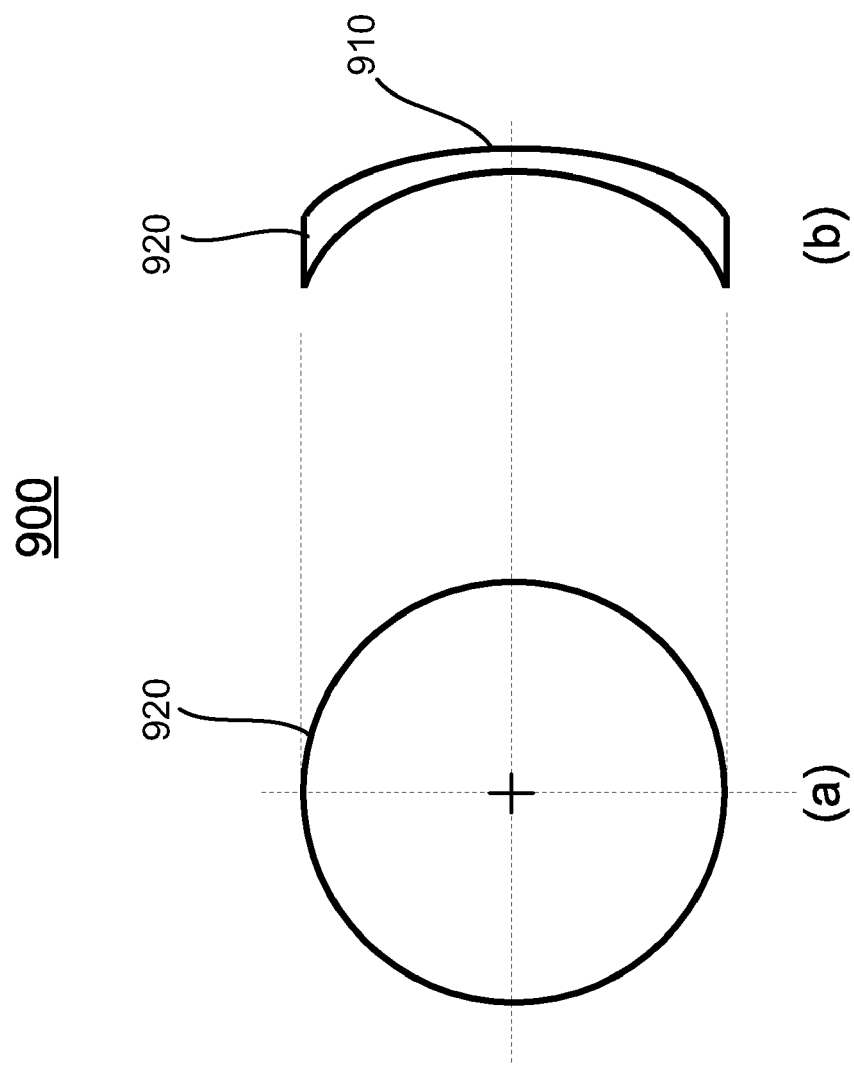
FIG. 9 shows schematically a conventional prescription lens, (a) a top view, and (b) a side view.

Referring to FIG. 2, a prescription minus lens 200 with a top view (a) and a side view (b) is schematically shown according to one embodiment of the present invention. The prescription lens 200 fitted for an eyeglass frame has a spherical front lens surface 216 with a front base curve configured to match a curve profile of the frame, a rear lens surface 218 curved such that the lens 200 has a central optical zone 211, an annular intermediate zone 213 surrounding the central optical zone 211, and an annular edge zone 215 surrounding the intermediate zone 213, and a lens body 210 defined between the spherical front lens surface 216 and the rear lens surface 218. The rear lens surface 218 in the central optical zone 211 has a curvature such that the central optical zone 211 of the lens 210 has a lens power substantially equal to a prescription for a wearer of the lens 210. The rear lens surface 218 in the edge zone 215 has a substantially flat profile. The rear lens surface 218 in the intermediate zone 213 has a curvature that smoothly bridges the curvature of the rear lens surface 218 in the central optical zone 211 and the flat profile of the rear lens surface 218 in the edge zone 215. The optical area is adapted for providing a lens power according to a prescription of a lens for a wearer. The thickness Te of the edge portion 215 is substantially constant and thinner than the maximum lens thickness of the optical area 211. The lens body 210 has a geometric center 212 and an optical center 214 that is corresponding to the center of the optical area 211. The optical center 214 is substantially displaced from the geometric center 212. The optical center can also substantially be coincident with the geometric center, as shown in FIGS. 5 and 7.

The spherical front lens surface 216 is configured to match the frame curve of a frame. The rear lens surface 218 at the optical area 211 of the lens body 210 is configured such that the lens body 210 at the optical area 211 corresponds to a single vision lens. In one embodiment, the rear lens surface at the optical area of the lens body is configured such that the lens body at the optical area corresponds to a progressive lens.

Figure 6:
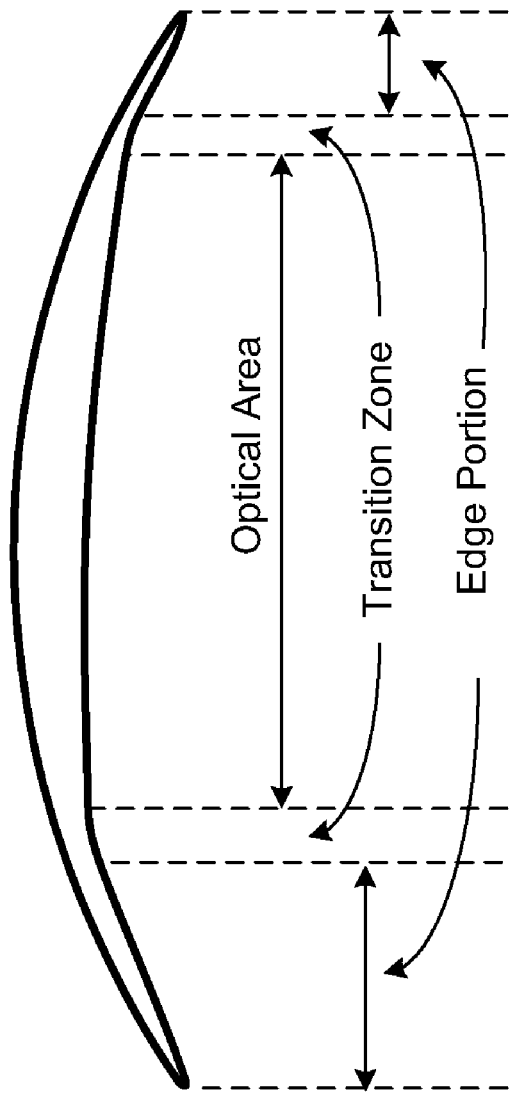
FIG. 6 shows schematically a prescription lens according to yet another embodiment of the present invention.

Additionally, rear lens surface 218 at the optical area 211 of the lens body 210 is configured such that the lens body 210 at the optical area 211 corresponds to a minus lens. In one embodiment, the rear lens surface at the optical area of the lens body is configured such that the lens body at the optical area corresponds to a plus lens, as shown in FIGS. 6 and 7.

The prescription lens is formed of a transparent material such as glass or plastic.

The prescription lens 200 can be manufactured by the following steps: at first, the information of a prescription lens and information of a frame to accommodate the prescription lens are acquired, where the information of the prescription lens comprises at least a lens power, an optical area and a spherical front base curve and other information described above. The information of the frame comprises a frame curve that is characterized with an angle and tilt of the frame. The spherical front base curve of the prescription lens is adapted for matching the frame curve of the frame. The frame angle, which is up to 24 degrees for a wrap around type sunglass, is measured. Additionally, the pantoscopic tilt of the frame in degrees is also measured or estimated at the time of performing the lens calculations. The information of the optical center height (OCH) or the distance above the bottom most portion of the frame is also needed.

Then with a combination of the pupil distance, the frame angle and the lens front curve selected, the lens angle is determined, which varies with each frame. Once the lens angle is known, then a compensation for the axis can be made.

The changes in sphere and cylinder power necessary due to the wrap angle are determined. The angle needed to cylinder, and the changes needed to the sphere and cylinder powers are determined so that the patient experiences the same sphere and cylinder as prescribed. The pupil distance (PD) is also compensated so that the optical center is mounted directly in the line of site of the patient. The actual lens surface is calculated to take all of these calculations into account.

Then, the lens thickness of the prescription lens at the optical area is calculated according to the information of the prescription lens. The calculating step is performed lens design software developed by Advanced Lens Technologies, LLC. The software is specifically designed to manage the patient's prescription and frame information, lens blank selection which enables the creation of personalized lenses for the customer. In one embodiment, the lens edge thickness and edge thinness are determined by the compensated prescription rear surface and resulting thickness of the optical area before determining the optical zone, intermediate and outer zone.

One of the advantages of the present invention is to determine the maximum thickness desired by a combination or individual value based on the prescription. For example: the maximum lens thickness for a −4.00 sphere with −0.75 cylinder at 80 degrees can be calculated based on the following formula: the maximum lens thickness=sphere power only, or the maximum lens thickness=(sphere power+cylinder power). The optical zone can be selected, based on an optical zone diameter or other shape that are predetermined. This will then be used as the maximum lens thickness at the edge of the selected optical zone in a minus lens. The lens thickness can be set for sphere+cylinder=maximum thickness of 5 mm for example. Then, the maximum size of the optical zone is calculated.

Once the maximum size of the optical zone is known, the intermediate zone and the outer zone are then calculated. The intermediate can be either predetermined with a size of, e.g., 5 mm, or can be varied based on various thickness lenses and desired cosmetic appearance.

FIG. 8(a) shows a top view of a prescribed minus lens 810 according to one embodiment of the present invention, showing how the wrap angle of about 22 degrees is determined. FIG. 8(b) shows a top view of a traditional minus lens 820, where, as a comparison, the profile of the prescribed minus lens 810 is outlined. It is clearly shown that the edge thickness of the prescribed minus lens 810 is much thinner than of the traditional minus lens 820.

Based on the calculated maximum lens thickness at the optical area, the information of the prescription lens and the information of the frame, a lens blank 201 is selected, as shown in FIG. 3(a).

The selected lens is then processed to obtain the prescription lens 200 that has an intermediate zone 213 surrounding the optical area 211 and an edge portion 215 surrounding the intermediate zone 213 such that the thickness Te of the edge portion 215 is substantially thinner than the maximum lens thickness of the optical area 211.

The selected lens can be a finished lens or a semi-finished lens. For a finished lens, as shown in FIG. 3(a), the processing step is performed by injection, casting and cutting the edge portion 217 of the finished lens so that the thickness of the edge portion is substantially constant and thinner than the maximum lens thickness of the optical area. According to the present invention, for a finished lens with blend zone and outer zone, the backside mold for the finished lens is much different from the traditional back surface mold for the finished lens. This invention allows for stronger minus and plus powered lenses to be made with an optical zone, and a blend zone, plus an outer zone. The traditional injected or cast lens is made with a back mold that is made to include the prescription powers only with no accommodation for a blend zone or other zones.

For a semi-finished lens, the processing step is performed by cutting a predetermined area of the semi-finished lens to form the optical area therein and cutting the edge portion of the semi-finished lens so that the thickness of the edge portion is constant and substantially thinner than the maximum lens thickness of the optical area.

The process of manufacturing a prescription sunglass lens using a spherical front lens surface manufactured to offer a best fit for the sunglass frame. This invention is not limited to sunglass lenses and is intended to cover any prescription lens used with the matching front base curve and frame curve. This invention acknowledges that a limited number of prescriptions will use the proper front lens base curve and matching frame curve, however the traditional methods of producing these prescription lenses would not compensate the prescription of the curvature of the wrap or tilt of the sunglass frame. This invention covers single vision finished lenses.

This offers cosmetic benefits as well as increased optical correctness. This invention is a combination of best appearing and fitting of a prescription lens. When viewed from the front this invention produces a prescription sunglass lens that fits in the frame like a non-prescription lens. When viewed from the backside the lens is produced to be thinner than a lens produced using traditional lens production methods currently used to produce the majority of prescription lenses.

A prescription sunglass lens is currently produced based on the prescription. Once the prescription is known a front spherical curve lens is recommended. Then the calculation for making the required prescription is determined. Production of the lens is then able to begin. The stronger the minus prescription lens is, the flatter the front base curve of the lens is recommended.

For example, a strong minus prescription of −4.00 sphere would traditionally recommend a front base curve of 2.00 to 4.00. To produce this for a lens with a base curve of 2.00 you would have to have a back surface curve of 6.00. With a front curve of 4.00 you would need a back curve of −8.00 to produce a −4.00 prescription. Both of these example lenses are now cut to fit the frame. Almost all sunglass frames are designed for a 6 base front curve lens or an 8 base front curve lens, (a few more recent frame designs require a 9 base front curve lens). To fit an incorrect front curve to a 6 or 8 base curve frame the lens will have a portion the prescription lens that does not fit exactly to the spherical front surface but rather to a bevel that has been applied to the prescription lens to allow it to be placed in a frame that the front curve was not designed for.

The solution this invention provides is that a prescription lens can be produced that will fit the frame curve with an almost perfect fit. To do this, the method of developing the lens form to produce a prescription that will allow the patient to see clearly must be calculated to take into account data currently not considered for the production of a sunglass prescription lens.

A limited number of optical professionals producing a prescription lens have changed the prescriptions to take into account the frame wrap and pantoscopic tilt. This makes the wearer able to see as if the wearer is looking through traditional prescription lenses made to fit flat to the face. The difference that this invention offers over the changes to wrap and tilt is that with this method of making a sunglass lens the lens prescription is adjusted for proper vision in the as worn position and the front base curve is matched to the frame.

This invention makes a lens that when viewed from the front, as if looking at the patient, does not look any different than a non-prescription lens. The optics of the lens is also modified by this invention to make the prescription work properly with the fit of the frame and the non-traditional front base curve that is used.

This invention has the ability to produce better fitting and better cosmetic looking lenses in both plus and minus powers. This benefit is produced by developing a lens that will work for the patents prescription based on the frame angle and tilt without considering the patients actual frame shape. The optical area of this lens may not extend to all parts of the frame. To accomplish producing a lens that the patient can see out of, and one that fits the frame, we must create area of the lens that make the lens fit and keep the prescription lens as thin as possible for the area of vision we have chosen to use.

The optical center and the geometric center are not located in the middle of the lens. The geometric center is the center of the circular lens, while the optical center is located 4 to 10 mm from the geometric center. This allows the lens to cover the frame and place the optical center in front of the patient's eye.

A significant aspect of this invention is the calculation of the thinnest lens that will still give the patient an excellent area of the lens that is optically correct for their prescription. To calculate the optimized lens we first need to know the patient prescription information. We also need the frame information. A trace of the frame or other method to acquire the frame shape is needed. Depending on the prescription a different target lens thickness is developed. As an example: A lens with a −5.00 sphere with an 8 base curve frame will produce a thick edged lens. Our software will calculate the prescription after it is optimized for lens and frame information including frame angle and frame tilt. If the desired maximum lens thickness is 4.5 mm then an optical area is described by the software where the maximum lens thickness is 4.5 mm. Any area outside this thickness that is greater than 4.5 mm would become a non-optically correct area and only be used to develop additional lens material needed to properly fit the frame so that the end result is a cosmetic design that has a good usable optical area yet looks like a non-prescription lens when worn by the patient.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A prescription lens fitted for an eyeglass frame, the lens having:
   (a) a spherical front lens surface with a front base curve configured to match a curve profile of the frame; and
   (b) a rear lens surface curved such that the lens has a central optical zone, an annular intermediate zone surrounding the central optical zone, and an annular edge zone surrounding the intermediate zone;
   wherein the rear lens surface in the central optical zone has a curvature such that the central optical zone of the lens has a lens power substantially equal to a prescription for a wearer of the lens, the rear lens surface in the edge zone has a substantially flat profile in a direction substantially perpendicular to an optical axis of the prescription lens, and the rear lens surface in the intermediate zone has a curvature that smoothly bridges the curvature of the rear lens surface in the central optical zone and the flat profile of the rear lens surface in the edge zone.

2. The prescription lens of claim 1, wherein an optical center of the lens is substantially coincident with a geometric center of the lens.

3. The prescription lens of claim 1, wherein an optical center of the lens is substantially displaced from a geometric center of the lens.

4. The prescription lens of claim 1, wherein the central optical zone of the lens corresponds to a single vision lens.

5. The prescription lens of claim 1, wherein the central optical zone of the lens corresponds to a multifocal lens, wherein the multifocal lens corresponds to a progressive lens or a bifocal lens.

6. The prescription lens of claim 1, wherein the central optical zone of the lens corresponds to a plus lens.

7. The prescription lens of claim 1, wherein the central optical zone of the lens corresponds to a minus lens.

8. The prescription lens of claim 1, being formed of a lens material, wherein the lens material comprises glass or plastic.

9. The prescription lens of claim 8, being formed by injecting or casting the lens material into a backside mold.

10. A lens fitted for an eyeglass frame, the lens having:
   (a) a spherical front lens surface with a front base curve configured to match a curve profile of the frame; and
   (b) a rear lens surface curved such that the lens has a central optical zone, an annular intermediate zone surrounding the central optical zone, and an annular edge zone surrounding the intermediate zone;

wherein the rear lens surface in the central optical zone has a curvature such that the central optical zone of the lens has a lens power substantially equal to a prescription for a wearer of the lens, the rear lens surface in the edge zone has a substantially flat profile in a direction substantially perpendicular to an optical axis of the prescription lens such that the lens has a substantially uniform edge thickness around a circumference of the lens, the edge thickness being thinner than a maximum thickness of the lens in the central optical zone, the rear lens surface in the intermediate zone has a curvature that smoothly bridges the curvature of the rear lens surface in the central optical zone and the flat profile of the rear lens surface in the edge zone.

11. The prescription lens of claim 10, wherein the front base curve of the lens is equal to about 6 diopters or about 8 diopters.

12. The prescription lens of claim 10, wherein the lens has a wrap angle of about 20 degrees.

* * * * *